United States Patent [19]

Hanke et al.

[11] 3,990,605
[45] Nov. 9, 1976

[54] CLOSURE MEANS FOR CIRCULAR OPENINGS OF LARGE DIAMETER

[75] Inventors: Rudi Hanke, Vienna; Johann Fröhlich, Dobermannsdorf, both of Austria

[73] Assignee: OMV Aktiengesellschaft, Vienna, Austria

[22] Filed: Nov. 20, 1974

[21] Appl. No.: 525,579

[30] Foreign Application Priority Data

Nov. 28, 1973  Austria ............................... 9972/73

[52] U.S. Cl. ................................ 220/316; 220/319; 220/334; 292/251; 292/256.6; 292/256.71; 292/256.73; 292/301; 292/DIG. 65

[51] Int. Cl.² ................ A47J 27/08; A47J 27/092; B65D 45/02

[58] Field of Search ................. 292/251, 301, 256.6, 292/256.71, 256.73; 220/316, 291, 288, 319

[56] References Cited

UNITED STATES PATENTS

| | | | |
|---|---|---|---|
| 1,398,832 | 11/1921 | Bonham | 220/288 |
| 2,435,913 | 2/1948 | Wall | 220/291 |
| 2,706,999 | 4/1955 | Pickard | 220/316 X |
| 2,938,648 | 5/1960 | Phelan et al. | 220/316 |
| 3,070,254 | 12/1962 | Carse et al. | 220/319 |
| 3,107,810 | 10/1963 | King | 220/316 |
| 3,225,929 | 12/1965 | Sicard | 220/288 X |
| 3,235,124 | 2/1966 | Kuever | 220/316 |
| 3,458,083 | 7/1969 | Erwin | 220/316 |
| 3,484,317 | 12/1969 | Dickerson | 220/288 X |
| 3,582,535 | 6/1971 | Appleton | 220/288 X |

FOREIGN PATENTS OR APPLICATIONS

| | | | |
|---|---|---|---|
| 889,783 | 7/1953 | Germany | 220/291 |
| 702,778 | 3/1966 | Italy | 220/316 |
| 793,901 | 4/1958 | United Kingdom | 220/316 |

*Primary Examiner*—Paul R. Gilliam
*Assistant Examiner*—Carl F. Pietruszka
*Attorney, Agent, or Firm*—Strauch, Nolan, Neale, Nies & Kurz

[57] ABSTRACT

A closure for a large diameter circular opening such as the end of a tubular conduit subjected to internal positive pressure comprises a coaxial cover lid that may be opened only when a pressure relieving venting valve is opened, the cover lid being connected over the opening by screw threaded means of larger diameter than the inside diameter of the opening, and the venting valve having a removable closure cap which impedes removal of the lid until the internal pressure is vented.

16 Claims, 5 Drawing Figures

CLOSURE MEANS FOR CIRCULAR OPENINGS OF LARGE DIAMETER

The present invention refers to a closure means for circular openings of large diameter, particularly openings accessible by operating personnel, in the walls of rooms, such as tubular conduits, being subjected to internal positive pressure, comprising a cover lid for covering said opening, noting that a venting opening of small cross section is in connection with the room subjected to internal positive pressure and is adapted to be closed by a venting valve and that a security means is provided which will allow the cover lid to be opened only with the venting valve opened. Such openings of large diameter include such openings which have a diameter of at least 100 to 250 mm. In view of the large surface area of the cover lid, such closure means are subjected to strong forces as long as the closed room is subjected to internal positive pressure. In case such cover lid of large surface area is being opened prior to pressure-venting the closed room, accidents are quite likely to occur. For avoiding accidents it has already been proposed to couple the venting opening with the cover lid in such a manner, that the cover lid can be completely opened only after having opened the venting valve. In a known embodiment of such an arrangement the venting valve is coupled with the cover lid by means of a plurality of articulated rods which are, however, subject to disturbances. In this known embodiment, the cover lid is provided with a bayonet catch which will completely give free the cover lid after rotating the cover lid for an only small angle, so that the disengaged cover lid will be thrown away is pressure venting has not or only incompletely been effected. For avoiding this danger, the cover lid is, according to an other known embodiment, removed in two steps. Thereby, when opening the venting valve a latch is set free, which can be shifted such that the bayonet catch can only be rotated to such an extent that the cover lid will not yet be given free but only will become untight, while in a second step the latch is being further moved for allowing the bayonet catch to be completely opened. In this manner, by untightening the seat of the cover lid it is made sure at any rate that the internal pressure is being vented, but the required construction is quite complicated.

The invention now aims at avoiding said drawbacks and essentially consists in that the cover lid is adapted for being connected with the constructional part comprising the opening to be closed by means of a screw thread having uninterrupted courses of thread and being in coaxial relation to the axis of the opening and having a greater diameter than the inside diameter of the opening, in that the venting valve is adapted for being opened by removing a closure cap and is fixed on one of the constructional parts to be relatively rotated when opening the thread connection and in that the other of the relatively rotationable constructional parts is provided with at least one abutment in the rotational path of which the closure cap of the venting valve is protruding. In view of the fact that the closure cap of the venting valve is protruding into the rotational path of an abutment even in closed position of the venting valve, the closure means is being securely and in a simple manner prevented from being opened. By connecting the cover lid with the rim surrounding the opening by means of engaging threads, the cover lid will not completely be given free on rotation but instead threreof the closure will first become untight. In case that pressure venting has not or only incompletely been effected, the pressurized fluid will discharge already when loosening the threaded lid, thereby warning the operating personnel, and, above all, the cover lid will not be given free immediately as is the case with a bayonet catch.

The opening movement of the cover lid can be initiated only after complete removal of the venting valve so that the security of operation is further increased. With such an embodiment it is convenient to provide in the closure cap outflow openings which will communicate with the venting opening after loosening the closure cap. Thus it is possible to first only loosen the closure cap for venting the internal pressure, noting that outflowing of the fluid can easily be recognized. Thus, a precautionary measure is being effected prior to complete opening of the closure cap. In a practical embodiment, the closure member for the venting opening may be formed of a ball arranged within the closure cap.

According to a preferred embodiment of the invention the arrangement can be such that the cover lid is connected with the surrounding rim of the opening by means of a retaining nut overlapping a flange surrounding the rim of the opening and being provided with a screw thread engaging a screw thread provided at the edge of the cover lid, and that the venting valve is arranged on the cover lid and the abutment for the closure cap of the venting valve is arranged on the retaining nut. Arrangement of the venting valve on the cover lid has the advantage of simple construction. With this embodiment, the rim of the opening can, according to the invention, comprise a flange overlapped by a retaining nut and the retaining nut can comprise a screw thread engaging a screw thread provided at the edge of the cover lid, noting that the retaining nut is divided in two halves, and, further, sliding surfaces can be provided on the constructional part comprising the rim of the opening for cooperating with the interior of the retaining nut and for centrally positioning said retaining nut. Such an embodiment enables the retaining nut to be guided such that engagement with the screw thread of the cover lid on closing the closure means will be facilitated, which is of importance for facilitating closing operation in view of the large diameter of the cover lid. The retaining nut can, according to the invention, be provided with abutting surfaces being arranged obliquely relative to a radial plane, which in turn is in a vertical position relative to the axis of the retaining nut, and having the same pitch as the screw thread of the retaining nut, and positioning screws cooperating with the abutting surfaces may be provided on the constructional part comprising the rim of the opening. By means of the abutting surfaces and of the positioning screws it becomes possible on closing the closure means to simply rotate the retaining nut and thereby to bring the retaining nut into engagement with the first course of the screw thread on the cover lid. Also this is of particular advantage with heavy-weighted retaining nuts of big dimensions. However, the arrangement can, according to the invention, also be such that the screw thread and the venting valve are provided on the rim surrounding the opening and that the abutment for the closure cap is arranged on the constructional part comprising the cooperating thread for the screw thread provided on said rim. In this case, the constructional part comprising the cooperating thread is formed of a retaining nut overlapping the edge of the cover lid.

According to a further preferred embodiment of the invention the opening is limited by an outwardly flaring hollow cone and the cover lid is provided with an annular protrusion to be inserted into the hollow cone, said annular protrusion forming the carrier for a sealing, particularly an O-ring. In this case, the arrangement is conveniently such that the annular protrusion of the cover lid to be introduced into the hollow cone is given a conical shape in the area between cover lid and O-ring and is given a cylindrical fitting surface for the inner edge of the opening. This provides the advantage that when opening the cover lid, the sealing ring is slowly lifted off its seat so that incomplete pressure release is indicated by gradual beginning of outflow of fluid during opening operation. A further advantage resides in that by exerting a relatively low axial force a high tightening pressure may be achieved. This is of advantage primarily in view of the relatively great forces to be exerted for opening and closing the connection provided by a threaded connection, the thread of which has a greater diameter than the inside diameter of the opening. When effecting closing operation by means of a retaining nut, the cover lid is not being rotated when opening or closing the threaded connection so that the sealing ring need only be pulled out of and, respectively pressed into the hollow cone.

The arrangement is conveniently such that between annular circular engaging surfaces, which are relatively rotated when tightening or loosening the threaded connection, there is provided an anti-friction disc of a material of low friction coefficient, particularly of a synthetic resin. The force to be exerted when opening and closing the closure means can further be reduced by giving, according to the invention, the thread the shape of a trapezoidal thread.

The invention is further illustrated by embodiments schematically illustrating a closure means provided at the end of a tube.

Figure 1:
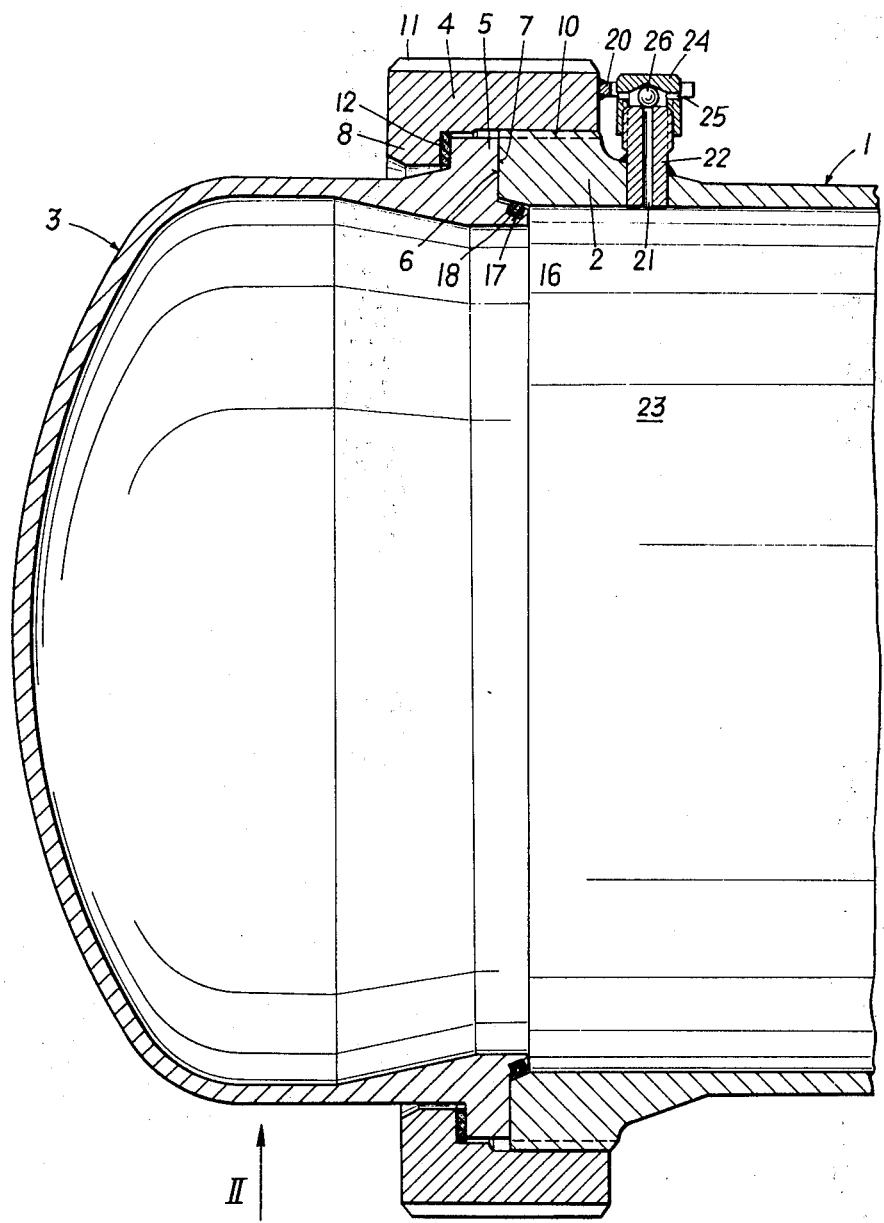
FIG. 1 represents an axial section through the cover lid and the opening.
Figure 2:
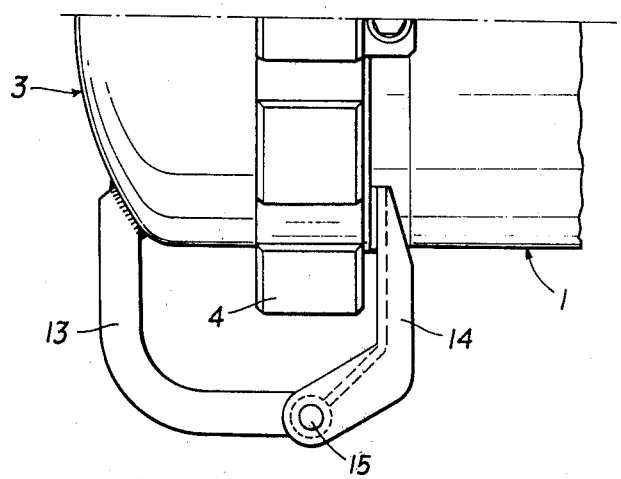
FIG. 2 shows a view seen in direction of arrow II.
Figure 3:
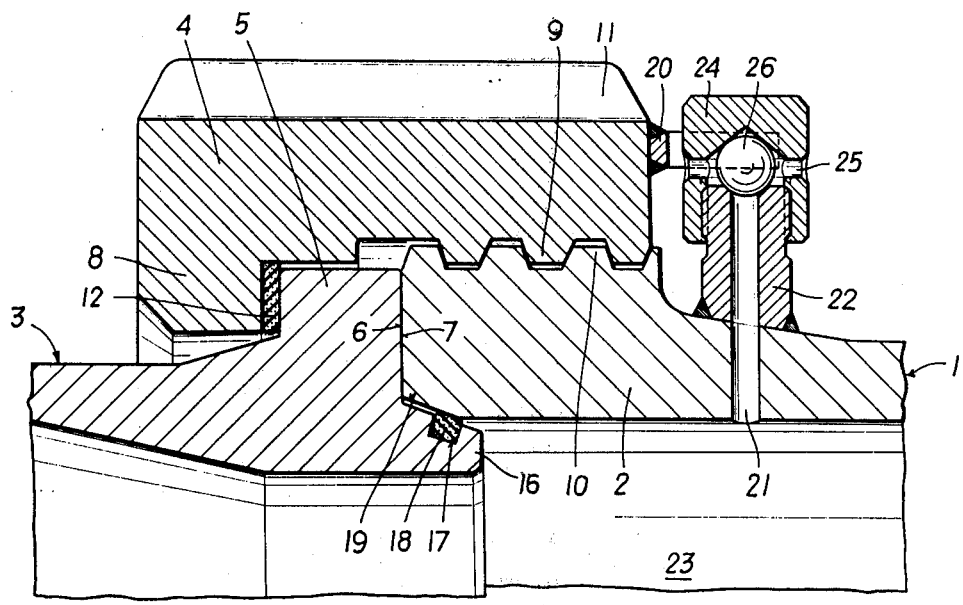
FIG. 3 shows in an enlarged scale a detail.

According to the embodiment shown in FIGS. 1 to 3, an annular constructional part 2 surrounding the opening to be closed is welded to one end of the tube 1. The cover lid is designated 3 and a retaining nut is designated 4. The cover lid is provided with a flange 5, the side face 6 of which is engaging the front surface 7 of the ring 2. Flange 5 is overlapped by a flange 8 of the retaining nut 4. The ring 2 is provided with a screw thread 10 and the retaining nut is provided with a screw thread 9 which will fit the screw thread 10. The screw thread has the shape of a trapezoidal thread. On the outer circumference of the retaining nut 4, usual attachment pieces 11 are provided for a hooked wrench. A tongue 13 is fixed to the cover lid 3 and pivotally linked by means of a pivotal axis 15 to an arm 14 laterally protruding from ring 2, so that the cover lid can be swung open around pivotal axis 15.

An annular sliding disc 12 consisting of a friction-reducing material, for instance synthetic plastics material, is inserted between flange 5 of the cover lid and flange 8 of the retaining nut for reducing as far as possible any resistance against rotational movement. The cover lid is provided with an annular protrusion 16 which has a conical outer surface and is provided with a groove 17 for accommodating an O-ring 18. This O-ring is cooperating with a hollow cone 19 machined on ring 2.

Tightening of the cover lid is effected by rotating nut 4 on its threads and sealing is provided by means of said O-ring, noting that the flange surfaces 6 and 7, by engaging one another, limit the depth to which the cover lid can be moved into the opening and thus are effective in preventing the annular protrusion 16 from being too deeply inserted through the cone 19.

As is shown in FIG. 3 in an enlarged scale, an abutment 20 is welded to the retaining nut 4. A socket 22 is welded to ring 2 and is provided with a venting opening 21 which opens into the internal space 23. 24 is a screw cap which is projecting into the rotational path of abutment 20, so that the retaining nut 4 can be loosened only after complete removal of closure cap 24. The socket 22 is of such reduced length that, with the closure cap 24 being removed, this socket can not collide with abutment 20. 25 are outflow openings through which the pressurized fluid can discharge as soon as a ball 26 arranged within closure cap 24 is being lifted off its seat. In this manner, pressure release can be slowly effected, and the closure cap 24 is completely removed only after complete pressure release.

In the embodiment shown in the drawing, the abutment 20 is bifurcated and is embracing the closure cap 24 on both sides.

Figures 4, 5:
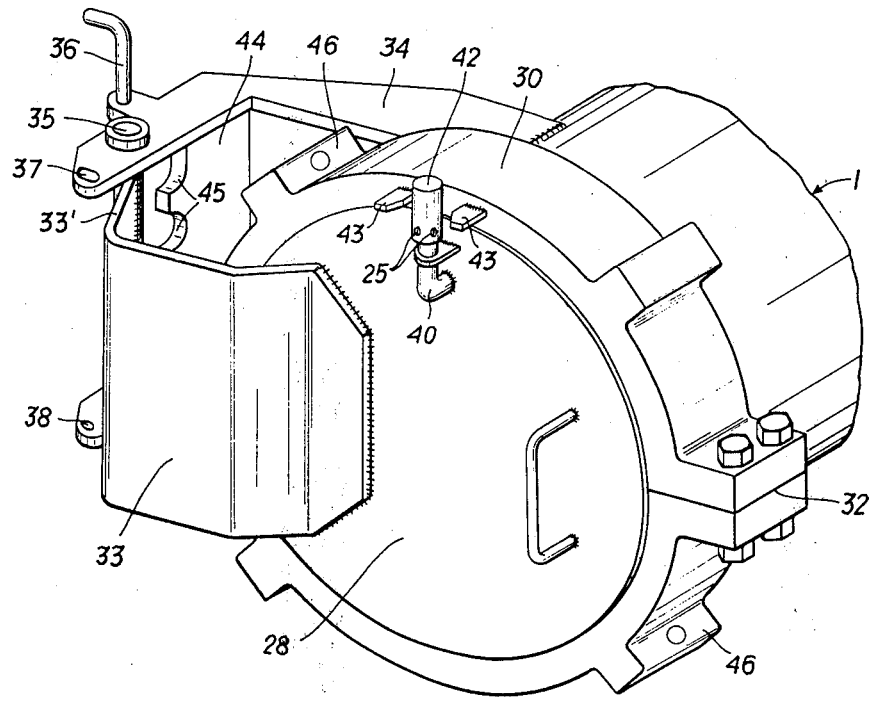
FIGS. 4 and 5 illustrate an other embodiment, noting that FIG. 4 is a perspective view of the cover lid and of the constructional part comprising the opening and that FIG. 5 represents an axial section.

In the embodiment shown in FIGS. 4 and 5, the annular constructional part welded to tube 1 is formed of a flange 27 which is not provided with a screw thread. Cover lid 28 is provided with a screw thread 29 at its edge. The cover lid 28 is being pressed against the flange 27 by a retaining nut 30 provided with an internal thread 31. Retaining nut 30 is of bipartite construction and is provided with two connecting joints 32, so that this retaining nut can be brought in overlapping position relative to flange 27. The cover lid 28 is pivotally connected by means of a tongue 33 welded onto the cover lid 28 to a supporting means 34 welded to tube 1, so that the cover lid can be moved around pivotal axis 35 and thus can easily be opened and closed. A rod 36 is removably suspended on the supporting means 34. With the cover lid 28 assuming opened position, this rod 36 may be inserted into holes 37 and 38 of the supporting means 34, i.e. in a position in which this rod 36 is located in front of tongue 33, so that the cover lid will be retained in opened position. For closing the cover lid, rod 36 must be pulled out of said holes 37 and 38, and, with the cover lid closed, rod 36 is again inserted into the provided holes, so that this rod is located exteriorly of tongue 33. Rod 36 is provided with cams not shown, so that by rotating rod 36 these cams can be pressed against the bent portion 33' of tongue 33 so that it is possible to force the cover lid 28 into closed position. For this purpose, the hole 37 must be sufficiently large for allowing the cams of rod 36 to be passed therethrough. The supporting means is provided with a plate 44 provided with notches 45. A crowbar may be inserted into these notches 45 for engaging one of the ribs 46, so that it is possible to apply to the retaining nut 30 a force for opening and closing the cover lid 28.

Angle-plates 47 are welded to tube 1 and are provided with guiding surfaces 48 for the retaining nut, so that the heavy-weighted retaining nut is maintained in the correct position for being screwed on the cover lid. Set screws 49 are threadedly inserted into the angle-plates. Cams 50 are welded to the retaining nut 30 and comprise abutting surfaces 51. These abutting surfaces are obliquely arranged relative to the axial plate assuming vertical position relative to the axes of threads 29, 31 and have the same pitch as the threads 29 and 31. As soon as, on closing of the cover lid, the retaining nut 30 has been shifted into engaging the thread 31 and has been brought into an angular position in which the thread 29 is capable of engaging the first course of the thread 31, the set screws 49 are brought into engagement with the abutting surfaces 51. When further rotating the retaining nut 30, the thread 29 is pressed into thread 31, so that the thread 29 can easily be screwed on the first course of thread 31. The angle-plates 47 and the set screws 49 are not shown in FIG. 4. These angle-plates 47 and set screws 49, as well as the cams 50, may be provided at a plurality of positions along the circumference, for example on two diametrically opposed positions.

The cover lid 28 is provided with a vented opening 39 which is, via a tube 40, in connection with a venting valve 41. The venting valve is being closed by mounting and, respectively, screwing the closure cap 42, and is being opened by removing this closure cap. 25 again are outflow openings through which gas may escape with the closure cap 42 being untightened. Closure cap 42 is embraced on both sides by abutments 43 arranged on the retaining nut 30, so that the retaining nut 30 cannot be rotated relative to the cover lid 28 as long as the closure cap is assuming a closed position. Only after removal of the closure cap, i.e. after pressure release has been completed, the retaining nut 30 can be rotated.

52 is an O-ring which provides the required seal between cover lid and cooperating flange. This O-ring is arranged on an annular protrusion 53 which in turn is being introduced into flange 27. The annular protrusion 53 is, at 54, conically shaped in the area of the O-ring facing the cover lid. On the opposing side of said O-ring 52 the annular protrusion introduced into the flange 27 is, at 55, cylindrical in shape and forms a fitting surface for the inner surface 56 of the annular flange 27. In this manner, the cover lid 28 is reliably seated.

What we claim is:

1. In a closure arrangement for means defining a space adapted to contain fluid under pressure comprising a cylindrical chamber portion having an opening at one end surrounded by a rim member, a removably mounted cover member for said opening, said cover member being formed with external threads, means pivotally mounting said cover member for swinging movement only about an axis normal to the axis of said opening, an annular projection on said cover member extending within said opening, seal means between said projection and the interior of said opening, an annular retainer being internally threaded and rotatably and axially displaceably mounted on said externally threaded cover member and so connected to the rim member that upon rotation of said retainer in one direction the cover and rim members are forced toward pressure tight association, said retainer being divided into two segments secured together, said space defining means further comprising axially shiftable means mounted adjacent said rim member, said retainer having inclined cam surfaces thereon cooperating with said axially shiftable means whereby action of said axially shiftable means against said cam faces causes the initial threads of said cover member and retainer to become engaged, a vent valve assembly comprising means defining a bore through said cover member a tube extended from said bore and terminating in a vent end portion disposed substantially radially with respect to the axis of said chamber portion opening, and a removable vent closing element on said vent end portion movable radially inwardly, with respect to said chamber axis, to a vent closing position and stop means on said retainer for cooperating with said vent closing element to prevent rotation of said retainer in the opposite direction when said vent closing element is in said vent closing position whereby substantial displacement of said cover member away from said opening is permitted only when said vent closing element is removed from said vent end portion.

2. In the closure arrangement defined in claim 1, said cam faces each having an inclination corresponding to the pitch of said threads and said axially shiftable means comprising a plurality of axially displaceable screws having ends abutting said cam faces to move said retainer into engagement with said cover.

3. In a closure arrangement for means defining a space adapted to contain fluid under pressure comprising a cylindrical chamber portion having an opening at one end surrounded by a rim member, a removably mounted cover member for said opening, means pivotally mounting said cover member for swinging movement only about an axis normal to the axis of said opening, an annular projection on said cover member extending within said opening, seal means between said projection and the interior of said opening, an annular retainer rotatably and axially displaceably mounted on one of said members by means of screw threads and so connected to the other member that upon rotation of said retainer in one direction the cover and rim members are forced toward pressure tight association, a vent valve assembly comprising means defining a bore through one of said members, a tube extended from said bore and terminating in a vent end portion disposed substantially radially with respect to the axis of said chamber portion opening, and a removable vent closing element on said vent end portion movable radially inwardly, with respect to said chamber axis, to a vent closing position and stop means on said retainer for cooperating with said vent closing element to prevent rotation of said retainer in the opposite direction when said vent closing element is in said vent closing position whereby substantial displacement of said cover member away from said opening is permitted only when said vent closing element is removed from said vent end portion.

4. In the closure arrangement defined in claim 3, there being cooperating seal means on the cover and rim member engaged in pressure tight relation when the cover is in closed position, and said screw threads are of such extent that initial rotation of said retainer in said opposite direction releases said seal means while retaining threaded engagement between the cover and space defining means.

5. In the closure arrangement defined in claim 4, said seal means comprising similar surfaces of revolution on said rim member and said cover member, and a resilient annulus compressed between said surfaces when the cover member is in closed position.

6. In the closure arrangement defined in claim 5, said surfaces of revolution being conical and said resilient annulus being disposed in a recess in one of said surfaces.

7. In the closure arrangement defined in claim 5, said surfaces of revolution being cylindrical and said resilient annulus being disposed in a recess in one of said surfaces.

8. In the closure arrangement defined in claim 3, said rim member having a flange on one side of which is a flat end face, said cover member having external threads for mounting said retainer and a flat end face for engaging said rim end face, and said retainer being provided at opposite ends with an internal flange adapted to engage the rim flange and stop abutment means coacting with said vent closing element.

9. In the closure arrangement defined in claim 9, sliding surfaces on said space defining means adjacent said rim, positioned and cooperating with a radially inward surface of said retainer for axially guiding said retainer.

10. In the closure arrangement defined in claim 9, axial abutment means on said space defining means adjacent said rim and inclined cooperating cam faces on the adjacent end of said retainer, the inclination of said cam faces corresponding to the pitch of said threads.

11. In the closure arrangement defined in claim 3, said rim being externally threaded to mount said retainer and said valve assembly being mounted on said space defining means adjacent the rim member.

12. In the closure arrangement defined in claim 3, said cover member being formed with external threads to mount said retainer and said valve assembly being mounted on said cover member.

13. In the closure arrangement defined in claim 3, said screw threads being trapezoidal.

14. In the closure arrangement defined in claim 3, said screw threads being such as to retain threaded engagement between said retainer and said one member until said element is removed.

15. In the closure arrangement defined in claim 3, said vent closing element being a valve closure cap, and said stop means comprising cooperating abutments on the retainer and cap.

16. In the closure arrangement defined in claim 3, said rim being formed with external threads on which said retainer is moved and with a flat end face, said cover member having a flange on one side of which is a flat end face adapted to engage the end face of said rim, and said retainer being provided at one end with an internal flange adapted to engage the cover flange and at the other end with stop abutment means coacting with said vent closing element.

* * * * *

UNITED STATES PATENT OFFICE
CERTIFICATE OF CORRECTION

PATENT NO. : 3,990,605
DATED : November 9, 1976
INVENTOR(S) : Rudi Hanke et al

It is certified that error appears in the above-identified patent and that said Letters Patent are hereby corrected as shown below:

Column 1, line 34 change "is" to --if--.

Column 1, line 59, change "rotationable" to --rotatable--.

Claim 9, line 1 change "9" to --8--.

Claim 10, line 1 change "9" to --8--.

Claim 16, line 3 change "moved" to --mounted--.

Signed and Sealed this

First Day of March 1977

[SEAL]

Attest:

RUTH C. MASON
*Attesting Officer*

C. MARSHALL DANN
*Commissioner of Patents and Trademarks*